(12) United States Patent
Gharavi et al.

(10) Patent No.: US 6,894,174 B1
(45) Date of Patent: May 17, 2005

(54) WATER-SOLUBLE POLYIMIDES AND METHODS OF MAKING AND USING SAME

(75) Inventors: Alireza Gharavi, Chicago, IL (US); Haythem Saadeh, Burbank, IL (US)

(73) Assignee: Shayda Technologies, Inc., Chicago, IL (US)

(*) Notice: Subject to any disclaimer, the term of this patent is extended or adjusted under 35 U.S.C. 154(b) by 0 days.

(21) Appl. No.: 10/439,140

(22) Filed: May 15, 2003

(51) Int. Cl.[7] .................... C07D 209/44; C07D 209/48
(52) U.S. Cl. ....................................... 548/469; 548/473
(58) Field of Search ................................ 548/469, 473

(56) References Cited

U.S. PATENT DOCUMENTS

| | | | | |
|---|---|---|---|---|
| 5,216,173 A | * | 6/1993 | Stephens et al. | 548/429 |
| 5,952,448 A | * | 9/1999 | Lee et al. | 528/170 |
| 2002/0009274 A1 | | 1/2002 | Gharavi | |

FOREIGN PATENT DOCUMENTS

| WO | WO 01/06240 | 1/2001 |
|---|---|---|
| WO | WO 01/06305 | 1/2001 |
| WO | WO 02/33005 | 4/2002 |

OTHER PUBLICATIONS

Bower et al., *J. Poly. Sci. A., 1*, 3135–3149 (1963).
Carlin et al., *J. Amer. Chem. Soc., 78*, 1992–97 (1956).
Kolb et al., *J. Syn. Commn., 11*, 763–67 (1981).
Li et al., *J. Poly. Sci. A: Polym. Chem., 36*, 1329–40 (1998).
Murry et al., *Syn. Commn., 2*, 389–394 (1972).
Saadeh et al., *Macromolecules, 30*, 5403–5407 (1997).

Yu et al., "A Generic Approach to Functionalizing Aromatic Polyimides for Second–Order Nonlinear Optics," *Macromolecules, 28*, 784–86 (1995).
Yu et al., "Novel Second Order Nonlinear Optical, Aromatic and Aliphatic Polyimides Exhibiting High Temperature Stability," *Appl. Phys. Lett., 66*, 1050–52 (1995).
Yu et al., "Novel Aromatic Polyimides for Nonlinear Optics," *J. Am. Chem. Soc. 117*, 11680–86 (1995).
Yu et al., "Highly Stable Copolyimides for Second–Order Nonlinear Optics," *Macromolecules, 29*, 6139–6142 (1996).
CRISP Abstract, Grant No. 1R43ES009477–01 to Alireza Gharavi, "Biosensors With Polymeric Optical Waveguides", Fiscal Year 1998 [published at http://crisp.cit.nih.gov/crisp/ . . . ].
STTR Abstract, STTR Phase I Grant to Alireza Gharavi, "A Multi–Functional Optical Switch: a WDM, Add/Drop Multiplexer and Cross–Connect Device", Fiscal Year 1998 [published at http://www.winbmdo.com/scripts/sbir/ . . . ].
SBIR Abstract, SBIR Phase I Grant to Alireza Gharavi, "Optical Materials: Water–Soluble Polyimides", Fiscal Year 2002 [published at http://www.winbmdo.com/scripts/sbir/ . . . ].
SBIR Abstract, SBIR Phase I Grant to Alireza Gharavi, "Mid–Infrared Stacked Waveguide Laser Arrays with Organic Light Emitting Diodes", Fiscal Year 2000 [published at http://www.winbmdo.com/scripts/sbir/ . . . ].

* cited by examiner

*Primary Examiner*—Golam M M Shameem
(74) *Attorney, Agent, or Firm*—Marshall, Gerstein & Borun LLP

(57) ABSTRACT

The present invention provides, among other things, water-soluble polyimides, methods of making water-soluble polyimides, and methods of using water-soluble polyimides, e.g., in optics applications as well as other applications.

5 Claims, 3 Drawing Sheets

WATER-SOLUBLE POLYIMIDES AND METHODS OF MAKING AND USING SAME

CROSS REFERENCE TO RELATED APPLICATIONS

This application claims the benefit of provisional U.S. Patent Application Ser. No. 60/380,581 filed May 15, 2002.

GOVERNMENT RIGHTS STATEMENT

The invention was made with Government support under Agreement No. 02-211A, awarded May 9, 2002 by the U.S. Department of Defense, The Small Business Innovation Research Program, to Alireza Gharavi of Shayda Technologies, Inc. (Chicago, Ill.), for a project entitled "Optical Materials: Water-Soluble Polyimides". Accordingly, the government may have certain rights in the invention.

TECHNICAL FIELD

The present invention relates inter alia to the field of optical materials and methods or materials for making and using the same. The optical materials optionally can be used in other applications.

BACKGROUND

During the past decade, the network capacity of the internet has grown faster than the traffic itself, but it has not always grown in the areas of greatest need. For instance, it has been easier to add capacity to the "long-haul backbone" that connects major Internet hubs in different cities than to add capacity to networks within cities themselves, i.e., within "metro-area networks" or the "last mile" to people's homes and offices. Optical communication is currently mostly employed in the core networks between the major metropolitan areas because deployment within the metropolitan areas has been cost-prohibitive. This has led to the current situation in which there is too much capacity in the long-haul pipes and unmet demand in cities and suburbs where the people who could use the bandwidth actually live and work. The profit-starved large carriers are in desperate need of new equipment that can lower their operating costs and provide new services like bandwidth on demand. (See, e.g., Schonfeld, "Can the Telecoms Bounce Back?", *Business* 2.0, 52–53 (December 2001)). Optical polymers have become a major player in the race to produce optical waveguides, switches, modulators, and the like, because they can provide a major cost and performance advantage over the competing inorganic technologies in the field. Such newer and cheaper technology potentially will extend the reach of broadband.

To fabricate such polymer-based waveguide devices, two main types of polymeric materials are needed: (1) cladding layers, and (2) active layers that are sandwiched between two cladding layers. Waveguides need to have a cross-section dimension of 8 microns, similar to that of a fiber optic core. At the same time waveguides need to be single-mode. This means that the refractive index of the core need only be slightly higher than the cladding layers ($\Delta n \approx 0.005$). (See, e.g., PCT International Application No. 01/06305). The index of refraction of the active polymer material used by various users and developers ranges between 1.5 to 1.7. Cladding layers are needed that have the same range of refractive index yet dissolve in totally non-interacting solvent systems to allow sequential layering without affecting underlying layers. Cladding materials which are processed in water would be ideal for this purpose.

Polyimides are a class of high performance materials that have exceptional properties. For instance, polyimides possess high optical transparency, low dielectric constants, high mechanical strength, oxidative and hydrolytic stability, as well as thermal stability. Polyimides have been used as electrical insulators, coatings, adhesives and in many other applications in the semiconductor industry. (See generally, Mittal (Ed.), "Polyimides", Plenum Press, New York, Vols. 1, 2 (1984)). Typically, polyimides have been synthesized by polycondensation of dianhydrides and primary diamines via a poly(amic acid) precursor which subsequently can be converted into a polyimide either thermally or chemically (Bower et al., *J. Poly. Sci. A.,* 1, 3135 (1963); Sroog et al., *J. Polym. Sci. A.,* 3, 1373 (1965)). However, it is well known that aromatic polyimides are insoluble in conventional solvents and infusible up to their decomposition temperature. Therefore, much effort has been devoted to synthesize organo-soluble, aromatic polyimides. The enhanced solubility of polyimides in organic solvents is achieved by a carefully modifying both the dianhydride and the diamine structures. These structural modifications can significantly reduce the electronic conjugation and loosen the intermolecular packing, while retaining the relative rigidity and linearity of the chain backbone configuration (Cheng et al., *TRIP,* 5, 51 (1997)).

However, cladding layers using organo-soluble polyimide currently have two problems. First, they generally suffer from low adhesion between adjacent layers. Second, they can interfere with (ie., partially dissolve) the active layer, especially if both layers are soluble in polar aprotic solvents such as N-methylpyrrolidone (NMP), dimethylformamide (DMF), and the like.

Accordingly, there exists a need for water-soluble polyimides, which would solve this problem of decreased adhesion and layer incompatibility upon processing. The development of such polymers would assist in making an all-polymeric optical integrated circuit and processor possible, as well as additional optical components for the telecommunications industry, including wavelength division multiplexers, polymer-waveguide biosensors, and the like. The polymers also optionally could be employed for other applications. For instance, the polymers could be of use in the electronics industry to cover and protect integrated circuits, and obviate and issues regarding solvents. The polymers also could be of use, e.g., as anti-reflective coatings for flat screen displays.

The present invention thus is directed, amongst other things, to water-soluble polymers, methods of obtaining such polymers, and methods of using such polymers, e.g., in optical devices. In particular, the present invention provides polyimides bearing functional groups which preferably can be converted into water-soluble salts, particularly ammonium salts, by reaction of various polyimide carboxylic acids with tertiary amines or ammonium hydroxide. These and other objects and advantages of the present invention, as well as additional inventive features, will be apparent from the description of the invention provided herein. The description and examples are provided to enhance the understanding of the invention, but are not intended to in any way to limit the scope of the invention.

BRIEF SUMMARY

One object of the present invention is to provide a series of hydrolyzable diamine monomers. These monomers preferably can be used in a reaction with aromatic dianhydrides to obtain polyimides with acid groups.

Another object of the invention is to provide synthetic approaches to obtain hydrolyzable diamine monomers.

A further object of the invention is to provide polymers of the above diamine monomers and dianhydrides.

Yet another object of the invention is to enhance the water solubility of the above polymers. The solubilities of these polymers preferably can be further enhanced, for instance, by obtaining the ammonium salts of the acids.

Still yet another object of the present invention is to use the above polymers, for instance, to make useful films. Toward this end, chemical analyses can be performed, water solubilities can be determined, optical properties such as refractive index and optical loss can be investigated, and adhesion properties can be assessed, on the polymers according to the invention to obtain a polymer that is optimally suited for a particular application. The polymers also optionally can be used for other applications, for instance, in the electronics industry.

DETAILED DESCRIPTION

Materials and Methods

Figure 1:
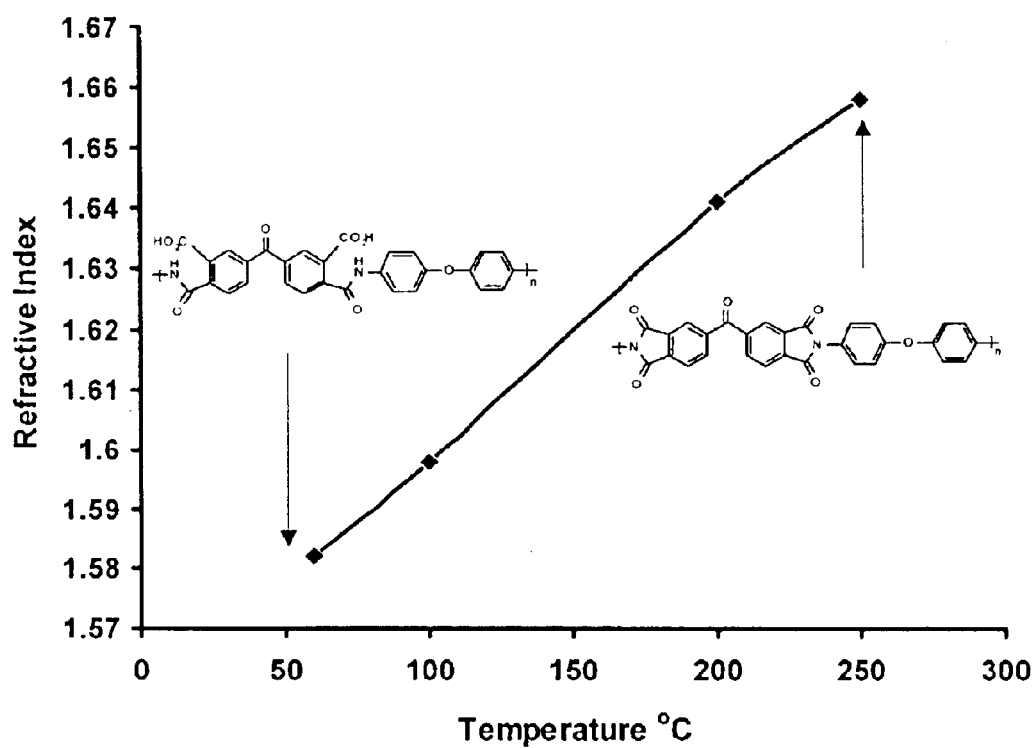
FIG. 1 is graph that shows the refractive index of a polyamic acid as a function of increasing temperature.

In the present invention, the following materials and methods were used. A waveguide fabricator was used to fabricate waveguides. A krypton-ion laser was used for waveguide writing. An argon-ion laser was also be used for waveguide writing and analysis. An optical spectrum analyzer was used for analysis of output signals. A Nuclear Magnetic Resonance (NMR) spectrophotometcer was used for chemical structural analysis. A waveguide-fiber aligning system was used to align fibers to waveguides. A prism coupler was used for index and thickness measurements. A CCD-based waveguide loss measurement set up was used to measure waveguide loss. An excimer laser was used for machining polymer layers. These, and other comparable materials and methods such as would be known to one skilled in the art optionally can be used in the practice of the invention as described herein.

Diamine Monomer and Extended Diamine Monomer Synthesis

One object of the present invention is to provide diamine monomers having the general structure:

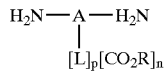

wherein A preferably is an alkyl, aryl, or biaryl (especially biphenyl) group, that optionally is substituted; L preferably is a linking group selected from the group consisting of null, a straight chain or branched alkyl group (particularly ethyl or methyl), optionally where the alkyl group is substituted; R preferably is hydrogen, alkyl (particularly ethyl or methyl, and optionally is substituted), amino, hydroxyl or an ammonium ion; p is independently 0–2; and n is independently 1–4. For reason of clarity, only some, but not all, of the bonds are depicted above. Unless specifically defined otherwise, these designations of A, L, R, p, and n apply to all chemical structures herein.

The diamine monomers preferably can be used in the synthesis of polymers, especially polyimides. Another object of the present invention is to provide a method of making diamine monomers. The synthesis and use of a typical diamine monomer 3 is outlined in Scheme I. The synthesis and use of a typical extended diamine monomer is set out in Scheme II. These schemes can be modified as described herein, e.g., as in the Examples. In particular, the schemes can be modified in that the synthesis of a particular component can be carried out in a different number of steps than as recited in the schemes, e.g., the step proceeding from compound 1 to compound 2, or from any compound to the next successive compound recited in the schemes can be done not as a single step (as depicted), but rather as two or more steps, or combined with other steps.

Scheme I—Exemplary Monomer Synthesis

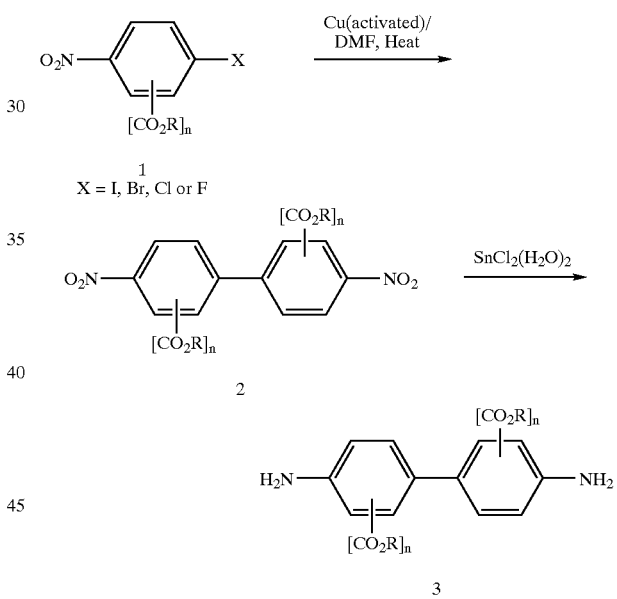

The synthesis set forth in Scheme I preferably can begin with an Ullmann coupling (Goshacv et al., A. S. *Russ. Chem. Rev.*, 41, 1046 (1972)) of the corresponding methyl 2-halo-5-nitrobenzoate 1 to give dimethoxylcarbonyl-4,4'-dinitrobiphenyl 2. Reduction of 2 gives the corresponding diamine 3.

Likewise, the extended diamine monomer 8 set forth in Scheme II below preferably can be prepared starting from 2-halo-5-nitrotoluene (p=1) (Carlin et al., *J. Amer. Chem. Soc.*, 78, 1997 (1956)). Ullmann coupling of 4 gives 4,4'-dinitrobiphenyl 5. Benzylic bromination of compound 5 results in compound 6. The carboxylate ester can be introduced by reacting compound 6 with, for example, a dimethyl malonate to give compound 7 (n=2) which is converted to the corresponding diamine 8 upon reduction. As can be seen from the schemes, monomer 8 has the potential for having twice as many ester groups compared to monomer 3.

Scheme II—Exemplary Extended Monomer Synthesis

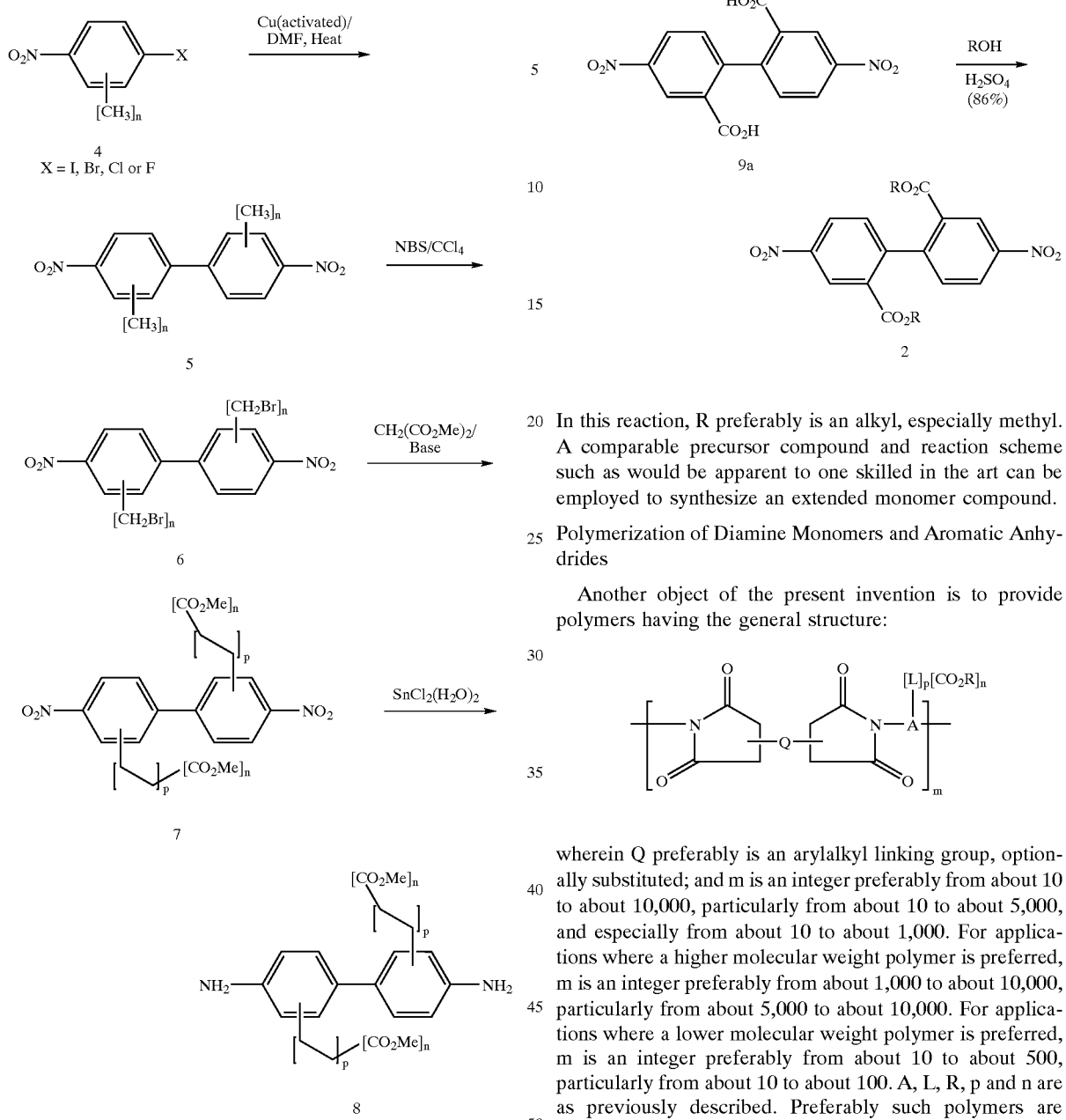

Optionally, additional precursor compounds can be employed for monomer synthesis. For-instance, compound 2 can be synthesized from the "precursor" compound 9 as follows:

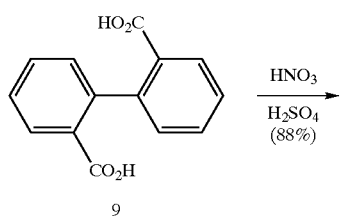

In this reaction, R preferably is an alkyl, especially methyl. A comparable precursor compound and reaction scheme such as would be apparent to one skilled in the art can be employed to synthesize an extended monomer compound.

Polymerization of Diamine Monomers and Aromatic Anhydrides

Another object of the present invention is to provide polymers having the general structure:

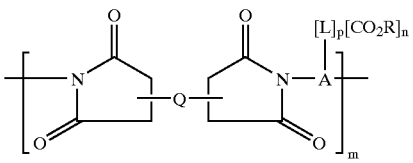

wherein Q preferably is an arylalkyl linking group, optionally substituted; and m is an integer preferably from about 10 to about 10,000, particularly from about 10 to about 5,000, and especially from about 10 to about 1,000. For applications where a higher molecular weight polymer is preferred, m is an integer preferably from about 1,000 to about 10,000, particularly from about 5,000 to about 10,000. For applications where a lower molecular weight polymer is preferred, m is an integer preferably from about 10 to about 500, particularly from about 10 to about 100. A, L, R, p and n are as previously described. Preferably such polymers are obtained from the above diamine monomers and dianhydrides. For reason of clarity, only some, but not all, of the bonds are depicted above. In particular, desirably Q is an arylalkyl group having the structure

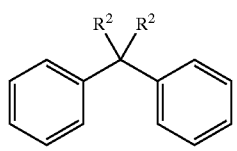

wherein $R^2$ is selected from the group consisting of Me, Et, and $CF_3$, $CI_3$, $CBr_3$ and $CCl_3$. An especially preferred structure for Q is where $R^2$ is selected from the group consisting of Me, Et and $CF_3$. Thus, a particularly preferred polymer according to the invention has the structure

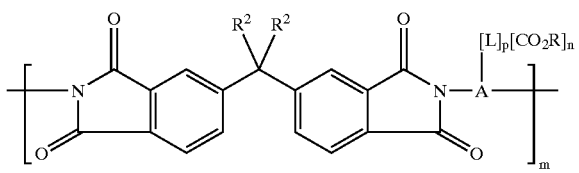

wherein $R^2$ is selected from the group consisting of Me, Et, $CF_3$, $CI_3$, $CBr_3$ and $CCl_3$, especially where $R^2$ is selected from the group consisting of Me, Et and $CF_3$. A, L, R, p, n, and m are as previously described.

As shown in Scheme III, preferably the polymers are synthesized by reacting an aromatic dianhydride (for example, compound 4) with a stoichiometric amount of a diamine monomer (for example, compounds 3 or 14) in a solvent. Examples of solvents which preferably can be used include, but are not limited to, N-methylpyrrolidinone (NMP), dimethylformamide (DMF), combinations thereof, and the like. Such a reaction gives the corresponding polyamic acid. In situ imidization of the resulting polyamic acid, e.g., with acetic anhydride ($Ac_2O$)pyridine (2:1), or by other appropriate reaction, preferably results in the corresponding polyimides (for example, compounds 11 and 12, respectively. (See, e.g., Saadeh et al., *Macromolecules*, 30, 5403 (1997) for a discussion of this reaction, hereby incorporated by reference for its teachings regarding same). Thermal imidization of the resulting polyamic acid also optionally can be employed to obtain the corresponding polyimides. Preferably the obtained polymers are soluble in a number of common organic solvents. Examples of such solvents include, but are not limited to, tetrahydrofuran (THF), dimethylsulfoxide (DMSO), DMF, NMP, chloroform ($CHCl_3$), combinations thereof, and the like. Desirably, these polymers are purified (or partially purified) by conventional methods.

Scheme III—Exemplary Polymer Synthesis

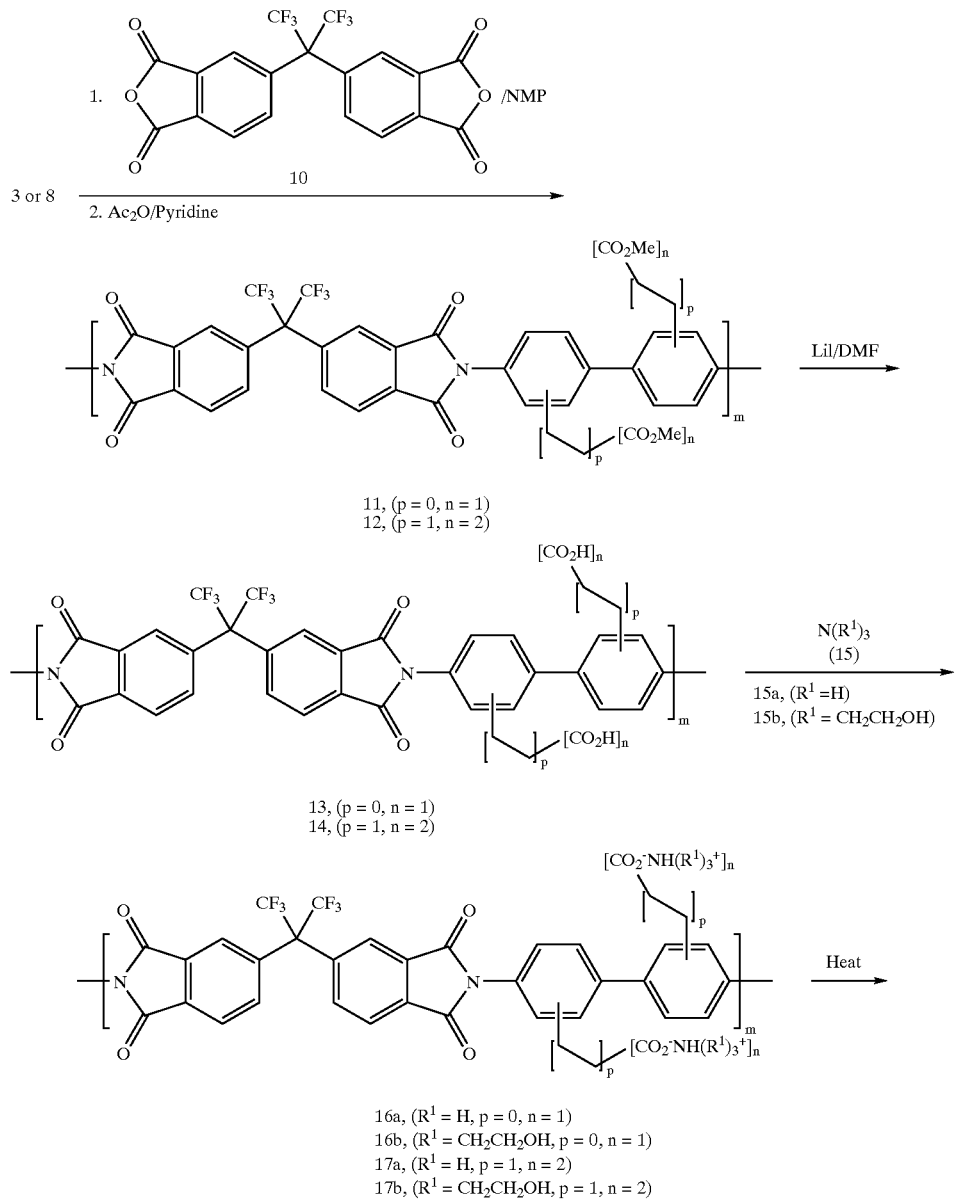

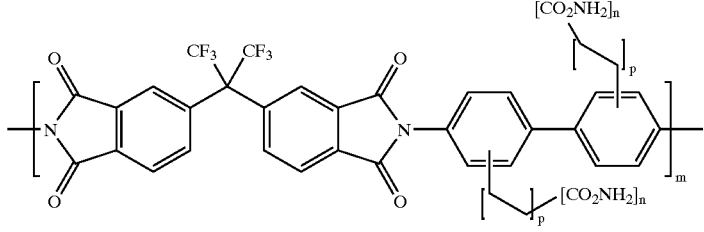

18, (p = 0, n = 1)
19, (p = 1, n = 2)

Hydrolysis to Water-Soluble Polyimides

Another object of the present invention is desirably to enhance the water solubility of the above polymers. To solubilize these polymers in water, preferably the ester groups (for example, compounds 11 and 12, Scheme III) are hydrolyzed to the corresponding acids (for example, compounds 13 and 14, respectively). These polyimide carboxylic acids (i.e., compounds 13 and 14) optionally are then converted to the corresponding polyimide ammonium salts. The polyimide carboxylic esters desirably are hydrolyzed under efficient and mild conditions. A wide range of reagents and conditions optionally can be used for this purpose, which include but are not limited to using lithium iodide (LiI) in DMF (Murry et al., *Syn. Commn.*, 2, 389 (1972)). Me₃ SiI (Kolb et al., *J. Syn. Commn.*, 11, 763 (1981)) is not preferred for use in the invention as this treatment may be too harsh, resulting in corruption of the polymer backbone, or otherwise resulting in lowered hydrolysis yields (e.g., due to competing reactions). Alternatively, the initial steps of the polymer synthesis can be done as follows:

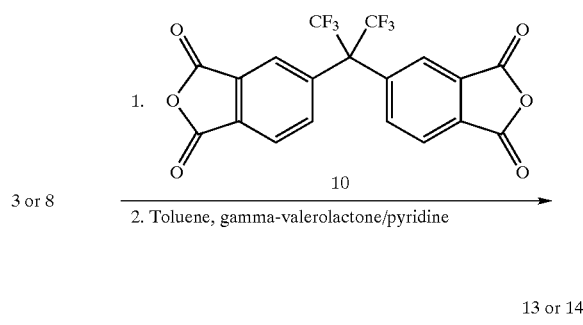

for instance, where the reaction is carried out at the appropriate temperature (e.g., at about 180° C.) for from about 3 to about 4 hours. This reaction is particularly preferred.

Ammonium salts of polyimides (for example, compounds 16a/16b and 17a/17b) preferably can be prepared by stirring polyimide carboxylic acids (for example, compounds 13 and 14, respectively) with a stoichiometric amount of ammonia ($R^1$=H) or triethanolamine ($R^1$=$CH_2CH_2OH$) in water. Optimally this is done until the polyimide is completely dissolved and gives a homogeneous and transparent solution (for example, see Li et al., *J. Poly. Sci. A: Polym. Chem.*, 36, 1329 (1998)). While not depicted in Scheme III, instead of ammonia or triethanolamine, compound 15 can be any other agent appropriate for generation of an ammonium salt, e.g., especially ammonium hydroxide, methylamine or triethylamine.

The water-solubility of the resulting hydrolyzed polymers preferably can then be determined. As a general rule, the water-solubility of polyimide ammonium salts increases by increasing the number of ions per repeating unit in the polymer chain. Therefore, for example, ammonium salt 17a or 17b would be expected to be more soluble than ammonium salt 16a or 16b.

Spincoating of Films from Aqueous Solutions of Polymers

Another objective of the present invention is to make useful films with the above polymers. Films preferably can be spincoated by conventional methods. The films are heat cured at elevated temperatures of about 200° C. and layered by standard techniques. The thermal curing of the resulting polymers (for example, compounds 16a and 17a) produces a polyimide-amide (for example, compounds 18 and 19) by releasing water. Because the amide groups are very polar, it is expected that additional rigidity is conferred to the polymer when compared with similar polyimides without such groups. The addition of these polar amide groups is expected to assist in adhesion between the adjacent polymer layers. At the same time, the curing temperature for this pyrolysis process is relatively low (~200° C.) and results in the release of minute amounts of water vapor.

Transparency and adhesion tests optionally can then be performed on the films to select the most appropriate polyimide material for a particular application. A number of polyimides have been synthesized in our laboratory which have properties appropriate for cladding. Table 1 summarizes the results of studies of refractive index variation with polymer structure of polymers which are not water-soluble. As the polymers are heated, imidization occurs, which increases the refractive index proportionally with the degree of imidization. For all these polymers in Table 1, k preferably is greater than about 10, even more desirably, k is an integer that ranges from about 10 to about 1000.

TABLE 1

Refractive Index Variation With Polymer Structure

| Polyamic acid | Heat | Polyimide | RI @ 60°C | RI @ 100°C | RI @ 200°C | RI @ 250°C |
|---|---|---|---|---|---|---|
| a | [structure] | [structure] | 1.538 | 1.551 | 1.608 | |
| b | [structure] | [structure] | 1.618 | 1.626 | 1.665 | |
| c | [structure] | [structure] | | 1.563 | 1.655 | |
| d | [structure] | [structure] | 1.617 | 1.638 | | 1.648 |
| e | [structure] | [structure] | 1.582 | 1.598 | 1.641 | 1.658 |

As can be seen from Table 1, the refractive index of polyamic acids varies with the degree of packing of the molecules and with temperature. For example, polymer b in Table 1 has a higher degree of packing than polymer a and therefore exhibits a higher refractive index. Polyamic acids exhibit a higher refractive index upon heat curing. This is due to the higher degree of packing available due to the ring closing of the amic acid after imidization. FIG. 1 shows the change in the refractive index of polymer e with increasing temperature.

As it can be seen from Schemes I-III and Table 1, it is possible to establish a structure-property relationship with the compounds of the present invention whereby modifying the structure of the monomers fine tunes the optical and physical properties of the polymers for appropriate applications and situations. This structure-property relationship enables the design of a number of polyimide-amides with different properties. Using these general chemical pathways, properties such as adhesion can be enhanced. Adhesive properties may be crucial for some applications of these polymers.

Uses and Other Considerations

The water-soluble polyimides of the present invention preferably can be used, among other things, in semiconductors, microelectronic applications and packaging, "stress relief" applications, optical switching and integrated optical circuits, and the like. A particularly preferred use is in polymeric integrated circuits, such as optical switches and waveguide-based sensors. Other uses would be apparent to one skilled in the art. Moreover, modification of polymer design so as to optimize the polymer for a particular application is well within the ordinary skill of a worker in the art, as are modifications of polymerization conditions, and film-making conditions. Some factors for consideration in such modifications are set out below.

Modifications to the polymerization reaction to obtain higher molecular weight polymers would be apparent to those versed in polymerization reactions, e.g., ensuring use of high quality reagents and an absence of impurities, ensuring dry reaction conditions, and generally improving the conditions under which polymerization is obtained. Polymerization with co-polymers (e.g., variations of those shown in Table 1) can be employed to fine tune the properties of the resultant polymers and polymer films. In particular, the solubility preferably of the salts can be enhanced by adding a third carboxylic group. However, even the lower molecular polymers, which generally produce "softer" films with heating at less than 300° C., might be ideal for particular electronics or optics applications. For instance, certain of the films could be of use in applications where complete curing (i.e., complete insolubility) of the polymer film is not required.

High quality films can be obtained using the polymers of the invention. With some of the polymers, a higher quality film can be obtained by ensuring complete removal of ammonium hydroxide, e.g., by thoroughly heating the solid that results after removal of ammonia following amidization. As an example, heating the solid at about 80° C. on a hot plate for up to about 2 hours after removal of the ammonia following amidization facilitates complete removal of ammonia. Following addition of distilled water, any formation of precipitate can be retarded by slow warming of the solution (~50° C.) and/or adding a drop of ammonium hydroxide.

Additionally, filtering the water-soluble solution directly onto the substrate to be spin-coated removes any particles that form during solution preparation and can reduce surface particulates and generally improve the surface quality of films. Particulates can in some instances originate from synthetic impurities in reagents used for polymerization, or from precipitated carboxylic acid derivative portions. Thus, a filter such as a 1.0-micron filter can be used to dispense the solution from a syringe.

Finally, baking and cooling films slowly can lead to a reduction in expansion/contraction within a film and help prevent any cracks.

EXAMPLES

The following examples further illustrate the present invention but, of course, should not be construed as in any way limiting its scope.

The examples presuppose an understanding of conventional methods well-known to those persons having ordinary skill in the art to which the examples pertain, e.g., polymer synthesis and film making. Such methods are described in detail in numerous publications including, but not limited to, for example, the following publications and patent applications, which are hereby incorporated by reference in their entireties for their teachings regarding polyimide structure, modification (especially with chromophores), synthesis, and incorporation into waveguides, and regarding chromophore structure and synthesis: Yu et al., "A Generic Approach to Functionalizing Aromatic Polyimides for Second-Order Nonlinear Optics," *Macromolecules*, 28, 784 (1995); Yu et al., "Novel Second Order Nonlinear Optical, Aromatic and Aliphatic Polyimides Exhibiting High Temperature Stability," *Appl. Phys. Lett.*, 66, 1050 (1995); Yu et al., "Development of Functionalized Polyimides for Second-Order Nonlinear Optics," *ASC Symposium Series* No. 601, Chapter 13, 172 (1995); Yu et al., "Novel Aromatic Polyimides for Nonlinear Optics," *Polymer Preprints*, 36, 39 (1995); Yu et al., "Novel Second-Order Nonlinear Optical Polyimides", *SPIE Proceedings*, 2527, (1995), Yu et al., "Novel Aromatic Polyimides for Nonlinear Optics," *J. Am. Chem. Soc.* 117, 11680, (1995); Yu et al., "Highly Stable Copolyimides for Second-Order Nonlinear Optics," *Macromolecules*, 29, 6139–6142 (1996); Yu et al., "Multifunctional Polymers Exhibiting Photorefractive Effects," *Accounts of Chemical Research*, 29(1), 13–21 (1996); Yu et al., "Polyimide with Diazo Chromophore Exhibiting High Thermal Stability and Large Electro Optic Coefficient," *Macromolecules*, 30(18), 5403–5407 (1997); Li et al., "A Multifunctional Photorefractive Material Showing High Optical Gain and Diffraction Efficiency," Advanced Materials, 10(12), 927–931 (1998); Saadeh et al, "Polyimides with a Diazo Chromophore Exhibiting Large Electrooptic Coefficients," *Polymer Preprints*, 38, 552 (1997); Saadeh et al., "Highly Stable, Functionalized Polyimides for Second Order Nonlinear Optics," *J. Mater. Chem.*, 9, 1865 (1999); Saadeh et al., "A New Synthetic Approach to Novel Polymers Exhibiting Large Electrooptic Coefficients and High Thermal Stability," *Macromolecules*, 33, 1570 (2000); PCT International Applications WO 01/06240, WO 01/06305, and WO 02/33005; and U.S. Patent Application Publication No. US-2002-0009274. In addition to the references cited above, the following further publications are hereby incorporated by reference in their entireties for their teachings regarding aspects of optical devices, including methods of fabrication: McPherson et al., "Dynamics of Up-conversion from Simultaneously Excited Pairs of $Er^{3+}$ Ions in Crystals of $CsMgCl_3$, $CsMgBr_3$ and $CsCdBr_3$," *Chemical Physics*, 165, 361–70, (1992); Gharavi et al., "Visible to Ultraviolet Up-conversion in $Er^{3+}$ Doped Cadmium Chloride and Zinc Chloride Glasses," *Applied Physics Letters*, 61(22),

Example 1

Monomer Synthesis

This example describes exemplary synthesis of diamine monomer containing carboxyl groups with high yield.

Preliminary results have shown that it is advantageous to design a monomer with a pendant carboxylic acid group, and then polymerize it to obtain the corresponding polyimide. This approach avoids the use of strong nucleophiles that are normally required to hydrolyze methyl ester groups, and which may be harsh on the polymer itself. A second advantage is that any uncertainty that all methyl ester groups are hydrolyzed to the corresponding carboxylic acid is avoided. The overall synthetic strategy described herein involved first the synthesis of diamine monomer via a reliable method, followed by identification of the best imidization conditions for the polyamic acid intermediate.

The following scheme (an illustration of Scheme I) was used to synthesize diamine monomer, compound 3a.

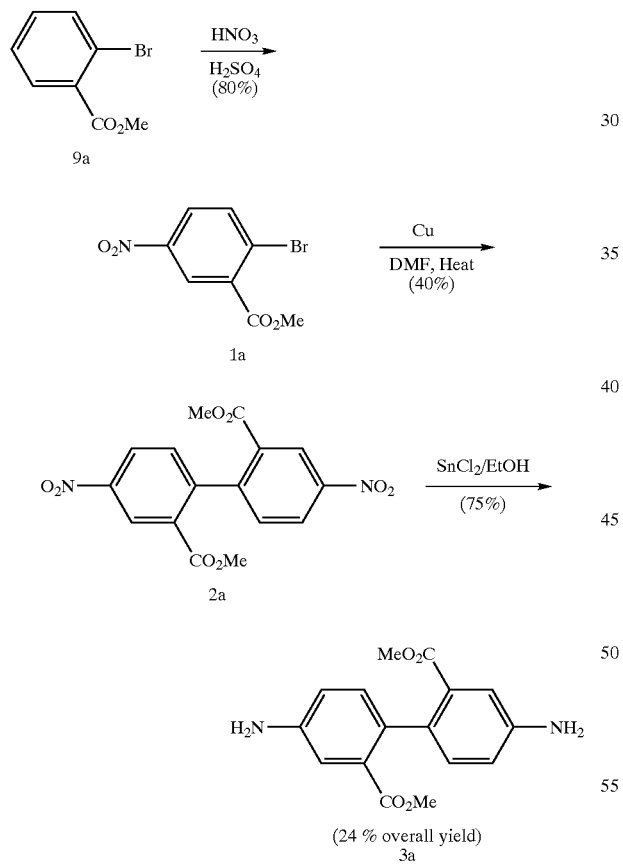

Compound 1a is a variation of compound 1 where n is 1, R is Me, and X is Br. Compound 2a is a variation of compound 2 where n is 1, and R is Me. Compound 3a is a variation of compound 3 where n is 1, and R is Me. Compound 9a is a variation of compound 9 where n is 1, R is Me, and X is Br.

A key step in this approach is formation of the biphenyl linkage, compound 2a. We confirmed that rapid addition of compound 1a to a mixture of Cu/DMF at 100° C., followed by refluxing the resulting mixture for 6 hours, gave biphenyl 2a in 40% yield.

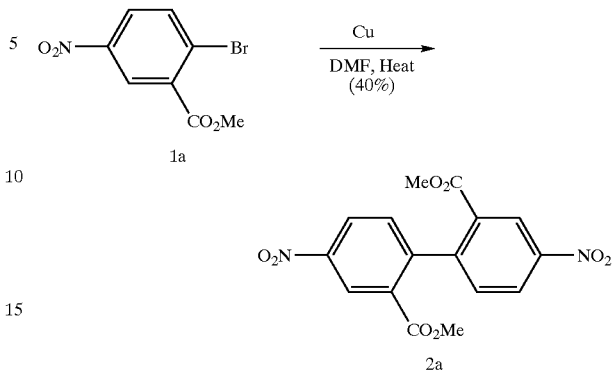

Example 2

Alternative Monomer Synthesis

An alternative approach towards the synthesis of monomers in higher yields involved using a commercially available biphenyl compound 9 (4,4'-dinitro-2,2'-biphenyldicarboxylate), which was then converted to compound 2b with high yield (~78%) as shown below:

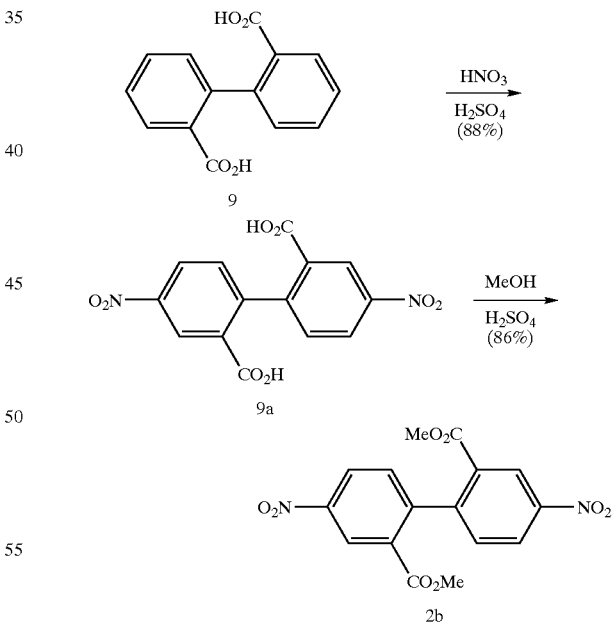

Compound 2b is a variation of compound 2 where n is 1 and R is Me. Compound 9a is a variation of compound 9 where certain H have been replaced by NO₂.

This approach is convenient because it can be used to synthesize other monomers with tetracarboxylic acid esters.

The proposed route is shown below.

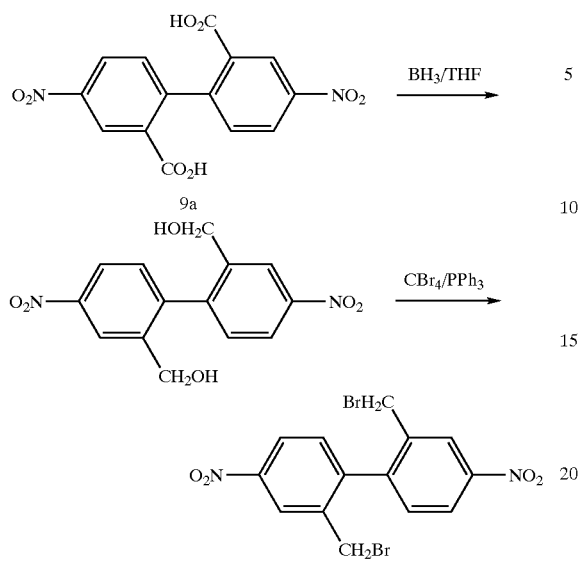

As shown below, starting with the compound 1b, reduction to the diamine 3b was achieved with reducing reagents including H$_2$/10% Pd—C or H$_2$/Raney Ni.

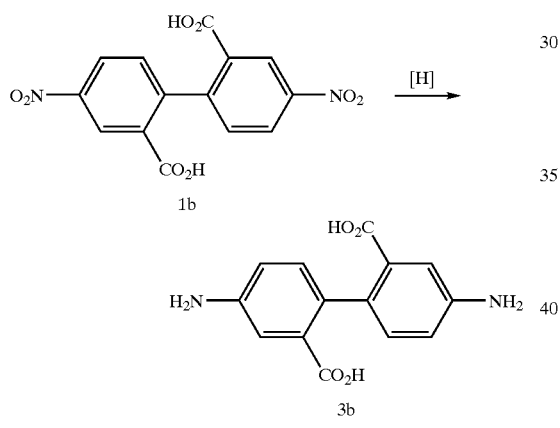

Compound 3b is a variation of compound 3 where n is 1, and R is H. A hydrogen balloon was used to provide hydrogen under these reaction conditions.

Alternatively, compound 1b was esterified to compound 2e. Compound 2c is identical to compound 2, except that the Me group is replaced by the Et group. Reduction of the nitro groups was then followed by ester hydrolysis by KOH, followed by careful acidification (pH~4), to give the target monomer compound 3d in good yield (overall 66% for all three steps).

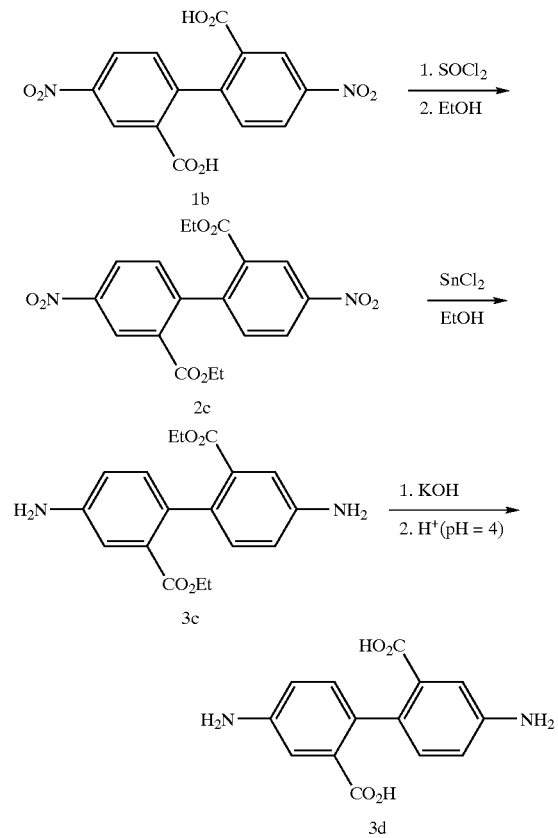

Compound 2c is a variation of compound 2 where n is 1, and R is Et. Compound 3c is a variation of compound 3 where n is 1, and R is Et. Compound 3d is a variation of compound 3 where n is 1, R is H.

Example 3

Polymerization

Polymerization was carried out by reacting the diamine monomer 3a with the corresponding dianhydride 10 to give a polyamic acid intermediate (not shown), which was converted subsequently to the corresponding polyimide 11.

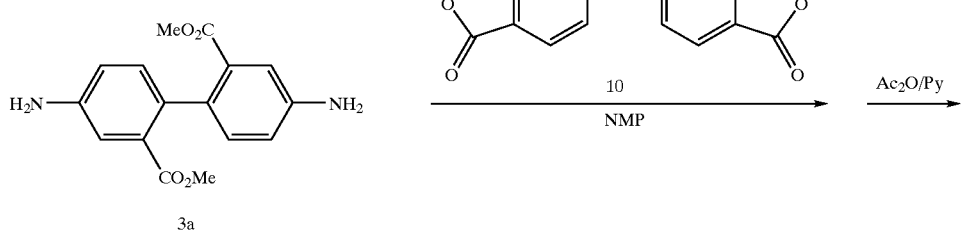

-continued

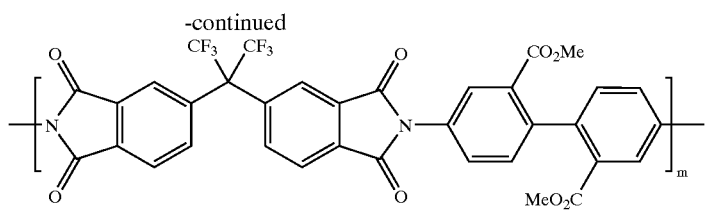

11

This polyimide was purified by conventional methods and the structure was confirmed by $^1$H—NMR. This polymer was then used as a starting material to make a polyimide with pendant carboxylic acid groups. To obtain this polymer, the pendant methyl ester groups were hydrolyzed with a strong nucleophile such as iodide (I$^-$). As shown below, this reaction proceeds through an active acyl iodide intermediate, which readily gives the corresponding acid upon treatment with H$_2$O.

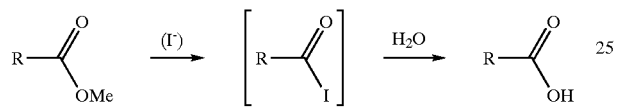

Example 4

Alternative Polymerization

Alternatively, polymerization was carried out by reacting the diamine monomer 3b with the corresponding dianhydride 10 in NMP to give the polyamic intermediate. Toluene and a catalytic amounts of y-valerolactone and pyridine (1:2; 2 mL) were added to the polyamic acid solution and heated to 180° C. for four hours. Toluene was used to remove the water formed during the reaction system by azeotropic distillation during imidization.

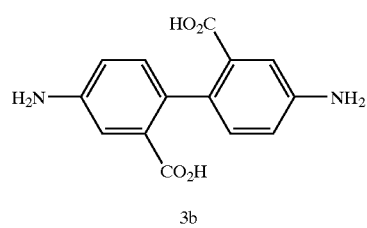

3b

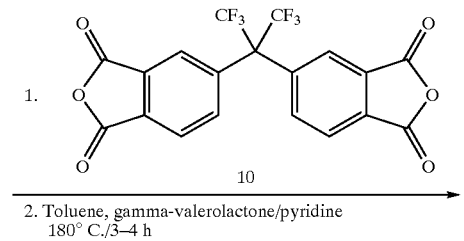

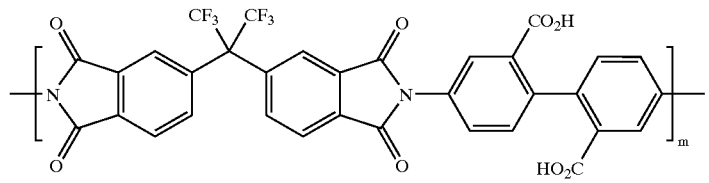

13

The resulting polymer is soluble in polar aprotic solvents such as DMSO and NMP, and also protic solvents such as NH$_4$OH solution. A concentrated NH$_4$OH solution was used to make good quality spin coated films (as described in the following Example).

Example 5

Film Making

This example describes exemplary spin-coating of polymer films, and examination of some of the mechanical properties of the resultant films.

To make the polymer 13 water soluble, it was dissolved in NH$_4$OH (e.g., 250 mg dissolved in 4 mL, which optionally was heated briefly to about 80° C.). In other experiments, methylamine was used instead of NH$_4$OH and produced comparable results. This formed the ammonium hydroxide salt of the polymer, which is very soluble in water. Very concentrated solutions with high viscosity were employed and used to give polymer films of several micron thickness. The films were then baked at temperatures exceeding 300° C. to convert the ammonium carboxylate salts to amide groups. This pyrolysis rendered the films insoluble in all the solvents used in the laboratory such as water, acetone, NMP, DMSO, DMF, and comparable solvents. As described herein, pyrolysis in this process is alternately referred to as "amidization".

A small portion of the unamidized polyamic acid precursor was taken and films were prepared by spin coating. The films were subsequently baked under a range of conditions of temperature and time on a hot plate in air. The film with the best surface quality was then used for measurements of refractive index and thickness. The data for one such film is shown in Table 2.

TABLE 2

Baking conditions and film properties at 1.5 micron wavelength

| Baking conditions | $n_{TE}$ polarization | $nT_M$ polarization | Film thickness ($\mu$m) |
|---|---|---|---|
| 100° C., 10 minutes | 1.564 | 1.567 | 11.7 |
| 150° C., 10 minutes | 1.574 | 1.572 | 9.9 |
| 200° C., 10 minutes | 1.581 | 1.578 | 8.7 |
| 260° C., 10 minutes | 1.585 | 1.580 | 8.2 |
| 300° C., 30 minutes | 1.593 | 1.586 | 7.8 |
| 300° C., 2 hours | 1.575 | 1.568 | 5.3 |

Figure 2:
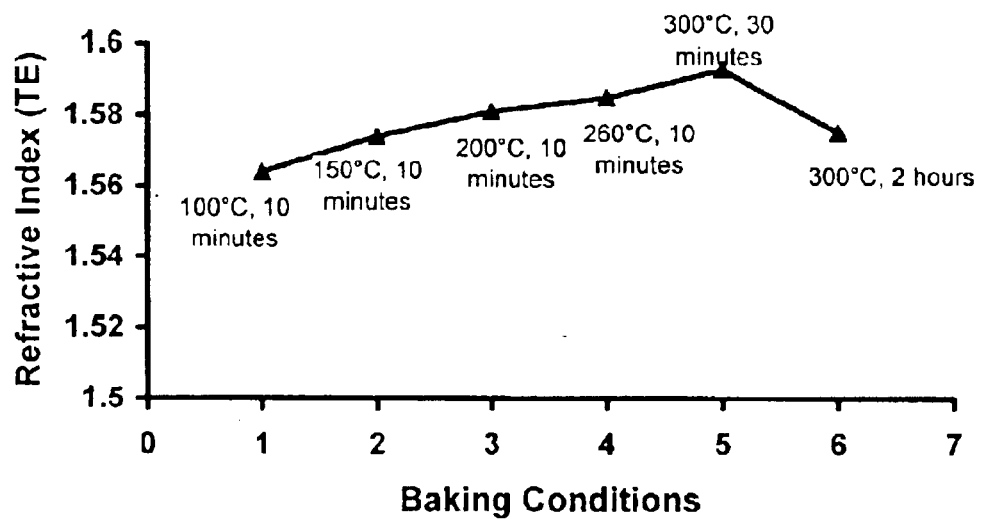
FIG. 2 is a graph that shows the refractive index for TE polarization as a function of bake condition for exemplary films prepared as described herein.
Figure 3:
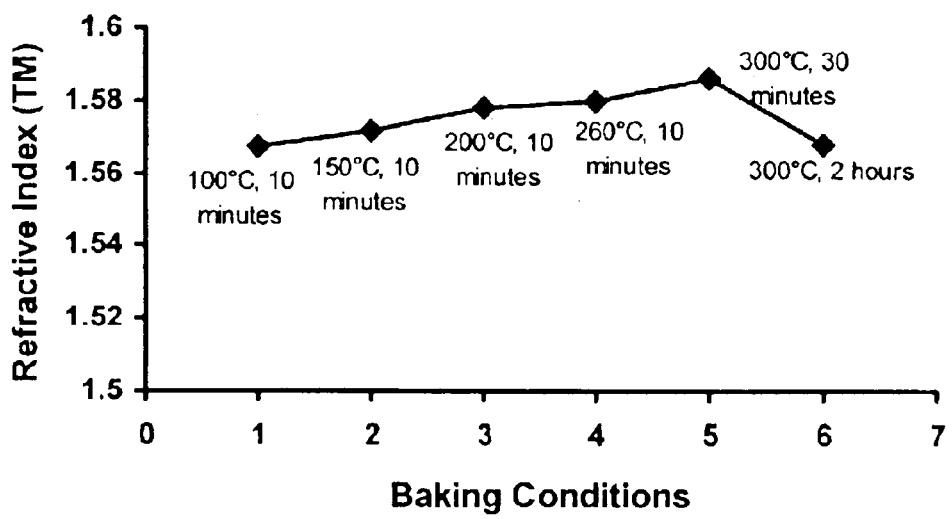
FIG. 3 is a graph that shows the refractive index for TM polarization as a function of bake condition for exemplary films prepared as described herein.
Figure 4:
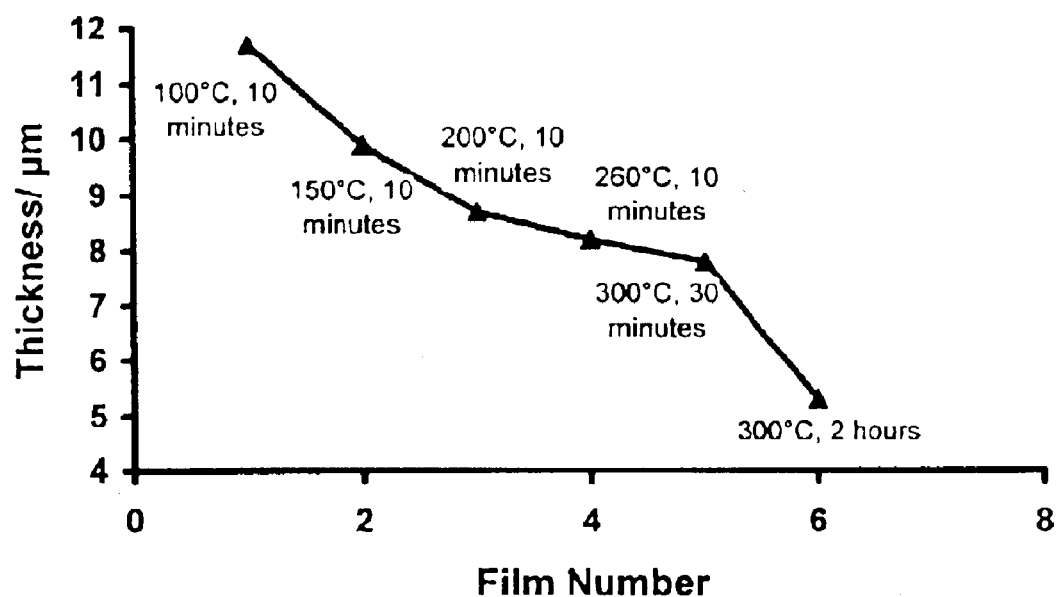
FIG. 4 is a graph that shows film thickness as a function of bake condition for exemplary films prepared as described herein.

The data in Table 2 are represented graphically in FIGS. 2–4. The refractive indices for both TE and TM polarizations increase gradually as the baking temperature is increased (as shown in FIGS. 2 and 3), corresponding to increasing density of the film. This is confirmed by the concomitant decrease in film thickness (depicted in FIG. 4). Typical polyamic acids become fully imidized while being heated at about 300° C. over a period of 1–2 hours, and the refractive index increases to a maximum during this process. The sharp decrease in the refractive index, combined with a decrease in the film thickness suggests that some of the polymers as described herein may not be stable when heated at 300° C. for extended periods (e.g., periods sometime greater than about half on hour). On the other hand, the data confirm that amidization of the polymers described herein can be obtained at lower temperatures than can typical polyamic acids. This may be useful with certain electronics applications where use of a higher temperature for curing is not feasible.

Attachment of CF$_3$ groups to a polyimide chain of this type produces a polymer having lower refractive index due to the increased separation between neighboring chains (i.e., lower density). The refractive index (n) for such materials would be expected to be between 1.53–1.57. The two CO$_2$H groups compensate for this by providing an increase in the refractive index because of increased attraction between side chains. Therefore, a refractive index that lies to the high side of that the range 1.53–1.57 (as was obtained) is not unexpected, and the polymers described herein exhibit properties that would be anticipated. This example confirms that the water-soluble salts as described herein can be used to produce useful films.

All of the references cited herein are hereby incorporated in their entireties by reference for all that they disclose.

While this invention has been described with an emphasis upon certain preferred embodiments, it will be obvious to those of ordinary skill in the art that variations in the preferred embodiments can be used, and that it is intended that the invention may be practiced otherwise than as specifically described herein. Accordingly, this invention includes all modifications encompassed within the spirit and scope of the invention as defined by the following claims.

What is claimed is:

1. A compound of the formula

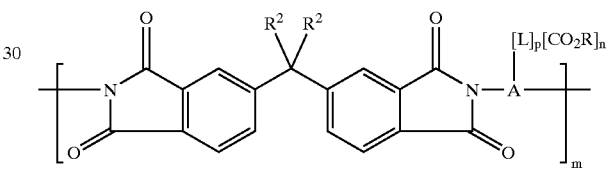

wherein A is an alkyl, aryl, or biaryl group; L is null, a straight chain, or a branched alkyl group; R is a hydrogen, an alkyl, or amino group, or an ammonium ion; R$^2$ is selected from the group consisting of Me, Et, CF$_3$, CI$_3$, CBr$_3$, and CCl$_3$; p is an integer from 0 to 2; n is an integer from 1 to 4, and m is an integer from 10 to 1000.

2. The compound of claim 1, wherein A is a biphenyl group.

3. The compound of claim 1, wherein L is an ethyl or methyl group.

4. The compound of claim 1, wherein R is an ethyl or methyl group.

5. A water-soluble salt of the compound of claim 1.

* * * * *